July 16, 1968    G. DE COYE DE CASTELET    3,392,535
ROTARY AIR-CONDITIONING DEVICES FOR AUTOMOTIVE
AND OTHER VEHICLES
Filed Nov. 21, 1966    2 Sheets-Sheet 1

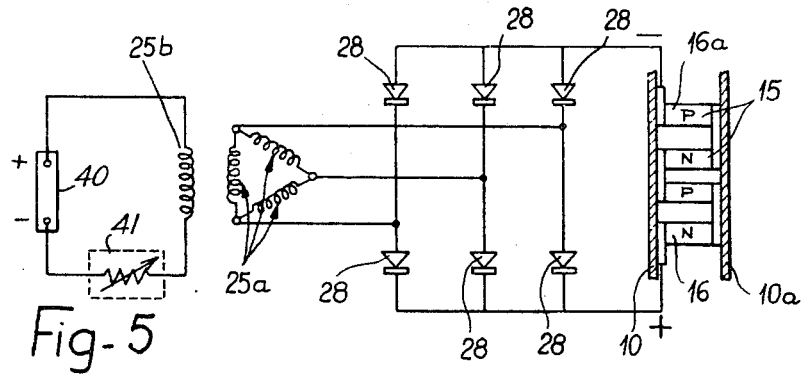
Fig-5
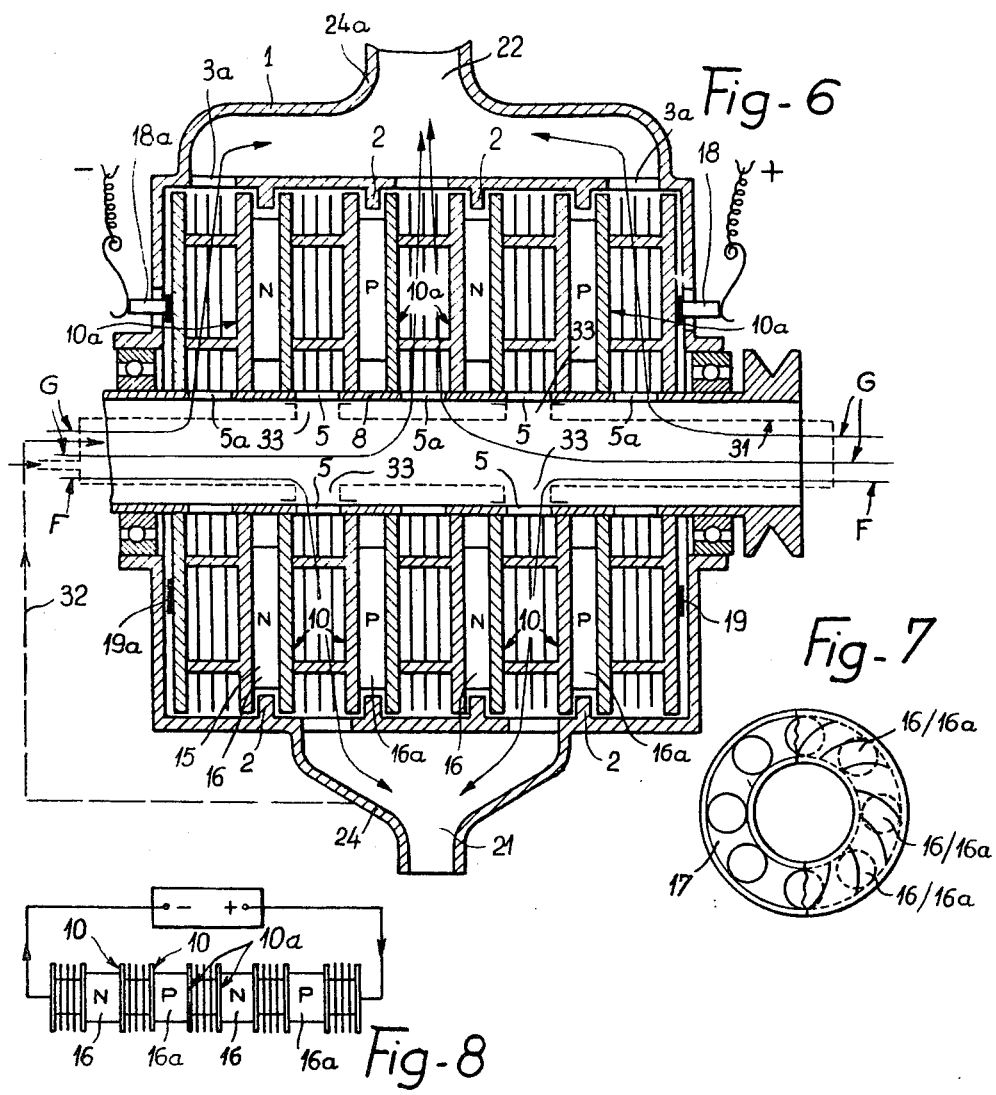
Fig-6
Fig-7
Fig-8

3,392,535
ROTARY AIR-CONDITIONING DEVICES FOR AUTOMOTIVE AND OTHER VEHICLES
Gaëtan de Coye de Castelet, Billancourt, France, assignor to Regie Nationale des Usines Renault, Billancourt, Hauts-de-Seine, France
Filed Nov. 21, 1966, Ser. No. 595,730
Claims priority, application France, Jan. 7, 1966, 45,193
7 Claims. (Cl. 62—3)

ABSTRACT OF THE DISCLOSURE

An air-conditioning device comprising a Peltier-effect thermoelectric element mounted in a casing with the ends thereof being in contact with fluids. Fluid driving fins and heat-transfer fins mounted on the ends of a turbomochine which drives the fins in the casing to pass the fluids over the thermoelectric element.

---

It is known that the main difficulty encountered in the design of air-conditioning systems utilizing the Peltier effect, or thermoelectrical elements, resides in the transfer of heat or cold units delivered by a thermoelectric element or modules to a gaseous medium surrounding the thermoelectric elements or modules. This difficulty led to provide the hot and cold ends of these elements with fins and to stir the fluids surrounding these fins for example by means of fans, in order to increase respectively the surface areas and the heat transfer coefficients of the device. As a result, the over-all dimensions of the air-conditioning device are increased to a substantial extent, thus further reducing the already limited space available in a vehicle or machine.

It is the chief object of this invention to avoid this drawback.

To this end, the present invention provides an air-conditioning device of the type comprising a casing, thermoelectric elements of the Peltier effect type mounted in said casing and having their ends in contact with fluids, this device, intended more particularly for automotive and other vehicles, such as space vehicles, satellites, etc., being characterised essentially in that said thermoelectric elements are provided at their ends with two types of fins, namely a first series of fins constituting fluid-driving blades of at least one double wheel or rotor of a turbomachine, and a second series of fins interconnecting said blades and acting primarily as heat transfer members, said wheel or rotor revolving in the stator-forming casing of the air-conditioning device and being adapted to stir or drive the fluids surrounding the ends of said thermoelectric elements.

The reduced over-all dimensions of the device of this invention permit of utilizing this device in a vehicle or machine of the type mentioned hereinabove, or even in private houses, in which it may act for instance as a portable complementary or make-up air-conditioning device.

Other features will appear in the following description with reference to the attached drawings illustrating diagrammatically by way of example a few forms of an embodiment of the invention. In the drawing:

FIGURES 4 and 6 are sectional views of alternate forms of embodiment of this invention;

FIGS. 5 and 8 are views showing a portion of the electrical system of the apparatus of FIGS. 4 and 6, respectively; and FIG. 7 is a plane view, with parts broken away, showing a single wheel of the apparatus of FIG. 6.

Figure 1:
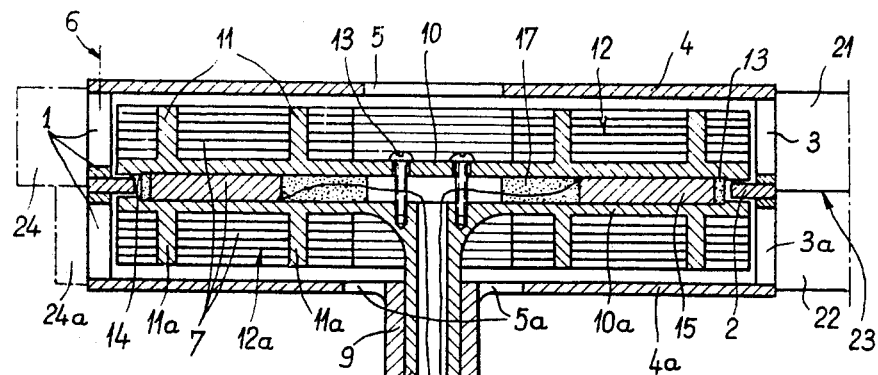
FIGURE 1 is an axial sectional view showing one of the possible forms of embodiment of the air-conditioning device of this invention, the section being taken along the line I—I of FIGURE 2.

Referring first to FIGURE 1 of the drawing, the device of this invention is shown as comprising a casing 1 formed with a circular rib 2 and outlet orifices 3 and 3a along its outer periphery, this casing 1 being closed by a pair of annular plates 4 and 4a in which inlet orifices 5 and 5a are formed, the plates 4 and 4a being secured to the casing 1 through suitable means shown in diagrammatic form at 6. Rotatably mounted in this casing, preferably of revolution, is a rotor 7 supported by a perferably hollow shaft 8 carried for example by a bearing 9 rigid with plate 4a.

This rotor 7, rotatably driven from an electric motor (not shown), comprises a pair of disks 10 an 10a, preferably of light alloy, formed with blades 11 and 11a extending at right angles to the plane of each disk. These blades are interconnected by an adequate number of circular rings 12 and 12a notched to permit the mounting of each ring at the proper height on the blades 11 and 11a. The circular rings mounted on a rotor of about 8" outer diameter may be spaced about 0.02" to 0.08" from one another, but these values are given by way of example only and should not be construed as limiting the scope of the invention.

Figure 3:
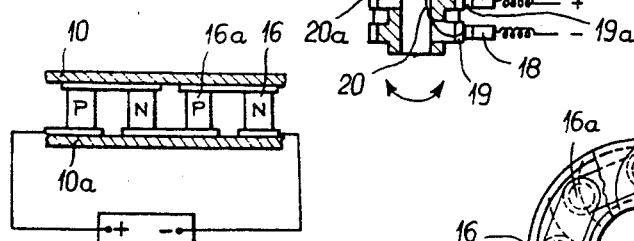
FIGURE 3 is a detail view showing one portion of the electrical system incorporated in the device of FIGURE 1.
Figure 2:
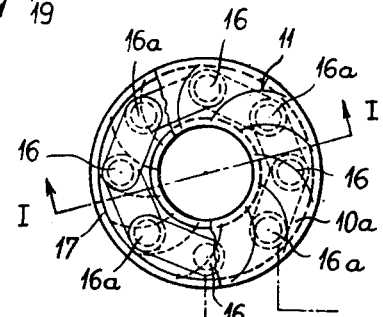
FIGURE 2 is a plane view from above, with parts broken away, showing on a smaller scale one of the wheels of the apparatus of FIGURE 1.

On the other hand, Peltier-effect or thermoelectric effect elements 15 and small plates 16 and 16a (FIGURES 2 and 3) are inserted between the disks 10 and 10a clamped and centered by means of members 13 and 14 and preferably anodized to constitute an insulating coating on their inner faces. The plates 16 and 16a are respectively of the N and P type and consist for example of a bismuth telluride and bismuth selenide compound. These elements or modules are coated along their side faces with a suitable insulating material 17, preferably a resin having a poor heat and electricity conductivity but a considerable mechanical strength. It will be noted that the elements 15 may also be glued to the disks 10 and 10a for example by using a monomer liquid of resin 17, this fastening method being omitted from the drawing.

An alternator, with rectifying diodes and of the permanent magnet or excitation type, or any other suitable D.C. source, may be used for energizing the elements or modules 15 via contact brushes 19 and 19a connected to these elements or modules 15 by means of lead-in wires 20 and 20a, the electric contact members 18, 19 and 18a, 19a being, if desired, conjugated with the electric motor.

In order to ensure a satisfactory heat coupling the disk 10 or 10a, the blades 11 or 11a, and the heat-conducting circular rings 12 and 12a are preferably of light alloy, These parts may if desired be cast as an integral unit, or welded to each other to constitute a unitary structure. Moreover, it will be noted that the inner faces of these disks co-act with the faces of rib 2 to provide a baffle arrangement separating the fluids circulated by the blades 11 and 11a.

The operation of the device described hereinabove will now be explained, assuming that the contact members 18a and 18 are respectively connected to the positive and negative terminals of the D.C. source.

The ends of the elements or modules 15 contacting the inner faces of disks 10 and 10a are adapted respectively to cool and heat fluids 21 and 22 sucked in through the inlet orifices 5 and 5a, and forced either directly (a partition 23, as shown in the right-hand portion of FIGURE 1, separating in this case the fluids 21 and 22), or into scrolls, collectors or manifolds 24 and 24a (left-hand portion of FIGURE 1). It will also be noted that the circular rings 12 and 12a increase considerably the heat transfer surface area of blades 11 and 11a while regularizing the fluid flows 21 and 22.

It will be readily understood that the aforesaid partition 23 may consist of the wall of a compartment mounted on the vehicle, fluid 21 being the tepid air of this compartment and fluid 22 the external or atmospheric air.

The air-conditioning device according to this invention may also be used as a heating apparatus, even if it is mounted as a permanent fixture, by reversing the direction of the direct current supplied thereto, for example by connecting the contact members 18 and 18a respectively to the positive and negative terminals of the D.C. source.

Figure 4:
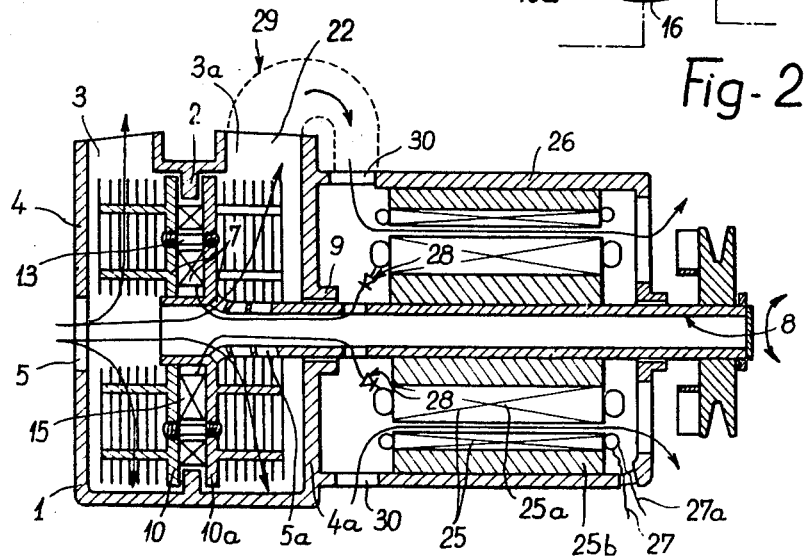

In a particularly compact form of embodiment of the device shown in FIGURES 4 and 5 which is particularly suitable for automotive vehicles propelled by an internal combustion engine (not shown), the shaft 8 of rotor 7 which is drivingly connected to this engine carries the armature 25a of an alternator 25 having its stator 25b housed in an extension 26 of casing 1 projecting from the side plate 4a, this stator being energized with direct current by means of conductors 27 and 27a from a suitable source (not shown). The alternating current (for example three-phase A.C.) delivered by the armature 25a is rectified preferably by means of diodes 28 before feeding the thermoelectric elements or modules 15.

FIG. 5 is an electrical schematic of the embodiment of FIG. 4 showing a D.C. source 40 connected to the stator 25b of the alternator 25 through a variable resistor 41. Alternating current developed in the armature windings 25a is rectified by diodes 28 before being fed to the plates 16 and Peltier effect elements 15.

It will be noted that the fluid 22, for example external air, may be used, after it has passed through the device of this invention, for cooling the armature windings 25a and stator windings 25b; in this case, the orifices 3a are connected through a pipe 29 (shown in dotted lines in FIGURE 4) to the ventilation air inlets 30 of alternator 25.

With this arrangement the sliding-contact assemblies 18 and 19, 18a and 19a may be dispensed with, this feature being advantageous were it only for the difficulty of establishing satisfactory and reliable sliding contacts due to the high current strength necessary for energizing the thermoelectric elements or modules 15.

FIGURES 6, 7 and 8 illustrate a modified form of embodiment of this invention wherein the thermoelectric elements are inserted between heat-conducting and electricity-conducting disks 10 and 10a mounted on the hollow or tubular shaft 8 which in this case is insulated and formed with air inlet orifices 5 and 5a. The disks 10 and 10a fed with D.C. from a suitable source by means of assemblies 18 and 19, 18a and 19a, comprising preferably a liquid ring of conducting metal due to the high current strengths contemplated, which may be of the order of several thousands amperes, are put into firm electrical contact with the aforesaid thermoelectric elements 15 through suitable means such as screws, bolts or tie-rods 13 of FIGURE 1, or, still better, by welding. These thermoelectric elements or modules may consist of wafers or small plates 16 or 16a respectively of the N and P types (see FIGURES 6, 7 and 8), the wafers interposed between two disks and all of same type (N or P) being coated with the material 17 serving the dual purpose of insulating and binding these wafers. With this arrangement thermal stresses are reduced to a substantial degree and the elements 15 are capable of withstanding the considerable centrifugal force developed during the operation of the device of this invention.

One fraction of the fluid drawn through the shaft 8 (see arrow F) is cooled as it flows through the gaps between the disks 10, the other fraction of this fluid (see arrow G) being heated between the other set of disks 10a, assuming that the energizing current circulates in the direction shown in FIGURE 8.

When it is desired to recycle the cooled fluid 21 in the apparatus of this invention, a sheath 31 either fixed (see FIGURE 6) or revolving with shaft 8, may be arranged inside this shaft. The inner section of this sheath connected to the manifold 24 by means of a connecting pipe 32 (shown in dotted lines in FIGURE 6) is provided with orifices 33 registering with the inlet orifices 5 (FIGURE 6) or 5a. If desired, some of the disks 10 and 10a may be dispensed with, and in this case the air inlets 5 and 5a are arranged in the resulting gaps.

Of course, the various forms of the embodiment shown and described herein should not be construed as limiting the invention since many modifications may be brought thereto without departing from the spirit and scope of the invention as set forth in the appended claims.

I claim:

1. An air-conditioning device of the type comprising a casing having inlet and outlet orifices and forming a stator for said device, a plurality of N and P-type Peltier-effect thermoelectric elements mounted in said casing with their ends in contact with fluids therein, an insulating material coating the side faces of said thermoelectric elements, a turbomachine comprising a hollow shaft extending into said casing, at least one double wheel mounted in opposed, spaced relationship on said shaft within said casing, said thermoelectric elements being clamped between said wheels, each said wheel being electrically insulated on its opposed face and having axially directed blades on its opposite face, a plurality of circular rings mounted on and interconnecting said blades, said wheels, blades, and circular rings forming a unitary heat conducting structure, means to revolve said wheel in said casing to drive the fluids surrounding the ends of said thermoelectric elements, and means to energize said thermoelectric elements through said shaft.

2. An air-conditioning device according to claim 1 in which the opposed faces of said wheels are anodized.

3. An air-conditioning device according to claim 1 in which said casing comprises a pair of side plates having at least one axial orifice in each said plate, a pair of coaxial annular plates each having at least one radial orifice therein, a circular rib mounted between said annular plates and depending into said casing, means fixedly mounting said annular plates and circular rib between said side plates, baffle means formed by coaction of said circular rib and the opposed faces of said wheels and serving to separate the fluids activated by the rotation of said turbomachine.

4. An air-conditioning device according to claim 1 in which said shaft is an electrically insulated shaft having rotary contacts on the end outside said casing and current conducting means passing axially therethrough.

5. An air-conditioning device according to claim 1 wherein said shaft is hollow, one of the fluids to be circulated being passed through said shaft.

6. An air-conditioning device according to claim 1 further comprising an alternator, having an armature and a stator, said armature being mounted on said shaft outside said casing, said stator being mounted in operative relation about said armature, means to feed direct current to said stator, and rectifier elements connected between said armature and said thermoelectric elements.

7. An air-conditioning device according to claim 1 in which said thermoelectric elements consist of a series of juxtaposed wafers.

References Cited

UNITED STATES PATENTS

| | | | |
|---|---|---|---|
| 664,776 | 12/1900 | Porter | 62—3 |
| 941,826 | 11/1909 | Taylor | 62—3 |
| 2,959,018 | 11/1960 | Hwang | 62—3 |
| 3,004,393 | 10/1961 | Alsing | 62—3 |
| 3,019,609 | 2/1962 | Pietsch | 62—3 |
| 3,138,934 | 6/1964 | Roane | 62—3 |

WILLIAM J. WYE, *Primary Examiner.*